DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED SEPTEMBER 7, 1976

950 O.G. 6

T950,007

BASE-CATALYZED CYCLIZATION OF POLYBUTADIENE

James Oziomek, Clinton, Ohio, assignor to The Firestone Tire & Rubber Company, Akron, Ohio

Continuation of abandoned application Ser. No. 452,774, Mar. 20, 1974. This application Nov. 7, 1975, Ser. No. 629,960

Int. Cl.[2] C08C *19/10, 19/22;* C08F *8/32, 8/48*

U.S. Cl. 526—21

No Drawing. 17 Pages Specification

This invention provides a process of cyclizing a high vinyl polybutadiene by heating the polymer in a hydrocarbon with a combination of an alkali metal alkyl and a chelating diamine. The polybutadiene prior to cyclization has at least 60%, and preferably up to at least 95% by weight of the butadiene in the vinyl-type of repeating units, the average molecular weight ranging from 1,000 to 10,000, preferably from 3,000 to 10,000. The amount of alkali metal alkyl used is between about 1 and 100 millimoles per hundred grams of polymer, and the chelating diamine is provided in a molar ratio to the alkali metal alkyl, of about 0.1 to 10.0. The cyclizing temperature ranges from about −10° to 100° C., preferably between 30° and 80° C.